US012810227B2

(12) United States Patent
Rubin et al.

(10) Patent No.: US 12,810,227 B2
(45) Date of Patent: Nov. 24, 2026

(54) SYSTEMS AND METHODS FOR AUTOMATIC PERFORMANCE ANALYSIS AND OPTIMIZATION

(71) Applicant: NAJ Innovations, Inc., New York, NY (US)

(72) Inventors: Yonatan Chaim Rubin, New York, NY (US); Christopher Holmes Sanchez, La Jolla, CA (US); Srushtiben Kankotiya, Jersey City, NJ (US)

(73) Assignee: NAJ Innovations, Inc., New York, NY (US)

( * ) Notice: Subject to any disclaimer, the term of this patent is extended or adjusted under 35 U.S.C. 154(b) by 131 days.

(21) Appl. No.: 18/593,302

(22) Filed: Mar. 1, 2024

(65) Prior Publication Data

US 2024/0296407 A1 Sep. 5, 2024

Related U.S. Application Data

(60) Provisional application No. 63/487,809, filed on Mar. 1, 2023.

(51) Int. Cl.
*G06Q 10/0637* (2023.01)
*G06Q 10/0639* (2023.01)

(52) U.S. Cl.
CPC ... *G06Q 10/0637* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 8,504,405 | B2 | 8/2013 | Miller |
| 11,461,726 | B2 | 10/2022 | Newman et al. |
| 2002/0178017 | A1 | 11/2002 | Stevens et al. |
| 2005/0182646 | A1 | 8/2005 | Gilmore |
| 2007/0156478 | A1 | 7/2007 | Breene |

(Continued)

FOREIGN PATENT DOCUMENTS

| | | | |
|---|---|---|---|
| KR | 10-2020-0111475 | A | 9/2020 |
| WO | WO 03/056406 | A2 | 7/2003 |

(Continued)

OTHER PUBLICATIONS

Khan, Jahangir, Automated Feature Engineering for ETL in Machine Learning Pipelines, Nov. 10, 2025, SSRN, pp. 1-14 (Year: 2025).*

*Primary Examiner* — Amanda Gurski
(74) *Attorney, Agent, or Firm* — Morgan, Lewis & Bockius LLP

(57) ABSTRACT

Methods and systems for performance optimization are described. An example method includes obtaining organizational data for an organization, the organizational data including forecasting data for the organization. The example method also includes obtaining situational data related to the organization, and identifying one or more variances in the organizational data based on an analysis of organizational data and the situational data. The example method further includes presenting information about the one or more variances, including one or more recommendations for addressing the one or more variances, to a user.

17 Claims, 4 Drawing Sheets

(56) References Cited

U.S. PATENT DOCUMENTS

| | | | | |
|---|---|---|---|---|
| 2009/0244067 | A1 * | 10/2009 | Pikovsky | H04L 41/142<br>345/440 |
| 2014/0278815 | A1 * | 9/2014 | Grant | G06Q 30/0201<br>705/7.36 |
| 2015/0186819 | A1 * | 7/2015 | Patel | G06Q 10/0637<br>705/7.36 |
| 2017/0116552 | A1 * | 4/2017 | Deodhar | G06Q 10/0639 |
| 2020/0234216 | A1 * | 7/2020 | Newman | G06Q 10/06393 |

FOREIGN PATENT DOCUMENTS

| | | | | |
|---|---|---|---|---|
| WO | WO 2003/093930 | A3 | 11/2003 | |
| WO | WO-03093930 | A2 * | 11/2003 | G06Q 30/02 |

* cited by examiner

SYSTEMS AND METHODS FOR AUTOMATIC PERFORMANCE ANALYSIS AND OPTIMIZATION

PRIORITY AND RELATED APPLICATIONS

This application claims priority to U.S. Provisional Patent Application No. 63/487,809, filed Mar. 1, 2023, and titled “Systems and Methods for Performance Analysis and Optimization,” which is hereby incorporated by reference in its entirety.

TECHNICAL FIELD

The disclosed embodiments generally relate to organizational performance analysis and optimization recommendations, including but not limited to, systems and methods for identifying patterns and deficiencies in organizational data such as key performance indicators.

BACKGROUND

In the dynamic modern world, the ability to make well-informed decisions based on real-time data is important for achieving success. Therefore, people may rely on a variety of external data sources, such as market trends, economic indicators, and competitor analysis, to gather insights and stay ahead in the competitive landscape. However, people face significant challenges when trying to extract useful insights from the vast and complex data. Manual data analysis methods lead to long processing times and the increased probability of human errors.

In this way, companies and other organizations, particularly startups, can have difficulty with identifying industry and economic trends and key metrics as well as appropriate key performance indicators. This causes problems and inefficiencies with operating and growing the organization, such as identifying when to expand into new locations, hire new employees, raise additional capital, reduce particular expenses, and the like.

SUMMARY

Accordingly, there is a need for a more streamlined and automated approach to analyzing external data sources and generating actionable insights. Such an approach enables companies to make proactive decisions based on real-time data, which leads to improved performance and a competitive edge. The present disclosure provides a system for automatically processing external data sources and delivering actionable insights tailored to users and/or companies. The present disclosure describes harnessing data processing techniques and machine learning algorithms to process/analyze massive quantities of external data in real-time. This allows the system to provide timely and pertinent insights, empowering users to make informed decisions.

Described herein are methods and systems for processing data sources and delivering actionable insights (e.g., suggestions and/or recommendations) to users (e.g., with regards to company operations). The systems described herein harvest and analyze data from diverse data sources (e.g., external data sources), including data regarding key performance indicators (KPIs), news, economic trends, competitor activity, and health and safety metrics. Using the data harvesting and analysis, the systems described herein are able to generate insightful notifications/recommendations tailored to a particular user or organization. Such notifications optionally include forecasts of upcoming events, such as fluctuations in a stock market or nascent industry trends, along with prescriptive recommendations for proactive measures users can implement to capitalize on these insights. In this way, the systems and methods described herein enable users and companies to make data-driven decisions in real-time.

In accordance with some embodiments, a method for automatically identifying patterns and/or associations is performed at computing system. The method includes obtaining organizational data for the organization; obtaining economic data and/or industry data for an industry related to the organization; identifying patterns and associations in the organizational data based on the economic data and/or the industry data; and presenting information about the patterns and associations to a user.

In some embodiments, a computing system includes one or more electronic devices. In some embodiments, an electronic device includes one or more processors and memory storing one or more programs; the one or more programs configured to be executed by the one or more processors. In some embodiments, the one or more programs include instructions for performing or causing performance of the operations of any of the methods described herein. In accordance with some embodiments, a computer readable storage medium has stored therein instructions that, when executed by a computing system cause the system to perform or cause performance of the operations of any of the methods described herein.

Thus, systems and electronic devices are provided with improved methods and interfaces for automatically identifying patterns and associations and providing corresponding recommendations, thereby increasing the effectiveness, efficiency, and user satisfaction with such systems and devices. Such methods and interfaces may complement or replace conventional methods for identifying information and providing recommendations to a user.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DESCRIPTION OF EMBODIMENTS

The present disclosure describes, among other things, a business intelligence platform and architecture, e.g., enabling organizations to mitigate future risks by leveraging diverse data and machine learning components. More accuracy and precision may be achieved by acquiring diverse data (e.g., from a variety of sources). However, this can result in a large amount of data that is difficult or impossible to process manually or with conventional systems. Moreover, pulling insights and recommended actions from diverse datasets is challenging as the patterns and associations in the data can be difficult or impossible to detect manually or with conventional systems. As described in detail below, systems described herein pull data from multiple data sources, transform the data into an appropriate form (e.g., a common structure), and analyze the data to provide insights and recommendations (e.g., using one or more machine learning engines to handle the large amounts of data).

Figure 1:
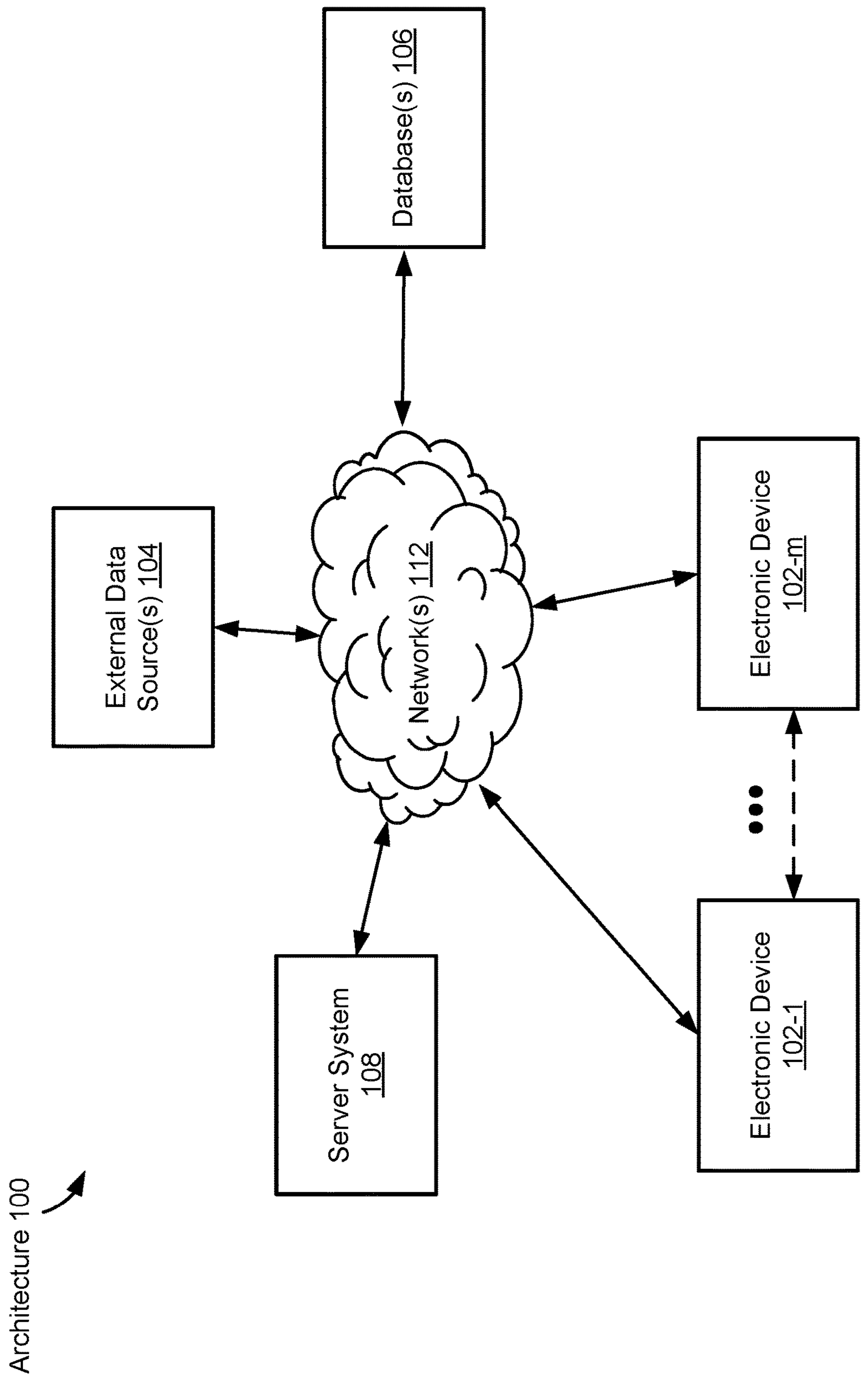
FIG. 1 is a block diagram illustrating an example data analysis architecture in accordance with some embodiments.

FIG. 1 is a block diagram illustrating a data analysis architecture 100 (e.g., a data analysis network) in accordance with some embodiments. The data analysis architecture 100 includes one or more electronic devices 102 (e.g., electronic device 102-1 to electronic device **102-*m*, where m is an integer greater than one), one or more external data sources 104, one or more databases 106, and/or a server system 108. In some embodiments, the server system 108 includes two or more server devices (e.g., is a distributed server system). In some embodiments, the data analysis architecture 100 includes a subset of the components shown in FIG. 1. For example, in accordance with some embodiments, the data analysis architecture 100 may not include an electronic device 102. In some embodiments, components of the data analysis architecture 100 may be combined or otherwise delineated. For example, the database(s) 106 may be components of the server system 108 and/or the electronic devices 102. In some embodiments, the data analysis architecture 100 includes one or more components not shown in FIG. 1** (e.g., a data service and/or one or more sensor components).

In accordance with some embodiments, the components of the data analysis architecture 100 are communicatively coupled via one or more networks 112. In some embodiments, the network(s) 112 include one or more wireless networks and/or one or more wired networks. In some embodiments, the network(s) 112 include one or more public communication networks (e.g., not requiring authentication) and/or one or more private communication networks (e.g., requiring authentication and/or restricted to a set of users). For example, the network(s) 112 may include one or more of: the Internet, other wide area networks (WAN), local area networks (LAN), virtual private networks (VPN), metropolitan area networks (MAN), peer-to-peer networks, and/or ad-hoc connections.

The external data source(s) 104 may be associated with (e.g., at least partially compose) one or more data-providing services. In some embodiments, the external data source(s) 104 include a source for organizational data (e.g., key performance indicator (KPI) data), a source for recent news events (e.g., information about industry events, economic events, organizational events, political events, and/or legal events), a source for traffic and/or weather updates, a source for economic data, a source for health/safety data, and/or a source regarding competitive data for an organization. In some embodiments, each data source in the external data source(s) 104 is communicatively coupled to other components of the data analysis architecture 100 via respective application programming interfaces (APIs). In some embodiments, external data source(s) 104 include a voice API, a connect API, and/or key service.

The database(s) 106 may include two or more types of databases (e.g., relational databases, object databases, graph databases, document databases, and/or network databases). In some embodiments, the database(s) 106 include one or more SQL databases and/or one or more noSQL databases. In some embodiments, the database(s) 106 include a flexible storage system (e.g., without tables and rows) that allows for different kinds of data to be stored in a way that is simple to adapt and grow as the system is used, thereby making the system efficient and able to handle increasing demands from users.

In some embodiments, the database(s) 106 are communicatively coupled to the external data source(s) 104 via an extract, transform, and load (ETL) component. In some embodiments, the ETL component is configured to obtain data from the external data source(s) 104, transform the obtained data (e.g., clean, convert, and/or edit the data), and load the transformed data into an output data container (e.g., for storage in the database(s) 106). In some embodiments, the ETL component comprises one or more scripts and/or functions (e.g., in a programming language such as a Python). In some embodiments, the ETL component comprises one or more platform as a service (PaaS) components (e.g., that utilizing virtualization to package/containerize data). In some embodiments, the database(s) 106 include a voice API, a connect API, and/or key service. For example, the database(s) 106 validate (e.g., using key service) the electronic devices 102 by exchanging one or more keys (e.g., tokens) with the electronic device(s) 102.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, a television (TV), and/or any other type of electronic device capable of interfacing with a user. The electronic devices 102 may connect to each other wirelessly and/or through a wired connection (e.g., directly through an interface, such as an HDMI interface). In some embodiments, the electronic devices 102-1 and **102-*m* are the same type of device (e.g., the electronic device 102-1 and the electronic device 102-*m* are both tablet computers). In some embodiments, the electronic devices 102 include two or more different types of devices. In some embodiments, the electronic devices 102 send and receive various types of data, instructions, and requests through network(s) 112. For example, the electronic devices 102 may send data acquisition/manipulation requests to database(s) 106 through network(s) 112. In some embodiments, an electronic device 102 works in conjunction with the server system 108** and/or other electronic devices to provide data analysis and recommendations.

In some embodiments, the electronic device 102-1 communicates directly with the electronic device **102-*m* (e.g., as illustrated by the dotted-line arrow), or any other electronic device 102. As illustrated in FIG. 1, the electronic device 102-1 may communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with the electronic device 102-*m*. In some embodiments, the electronic device 102-1 communicates with the electronic device 102-*m* through network(s) 112**.

The systems described herein include a web application platform (e.g., executing at the server system 108 or an electronic device 102) configured to provide efficient and seamless analysis, notifications, and recommendations. In some embodiments, a frontend for the platform (e.g., a graphical user interface) is implemented using a programming language, such as JavaScript (e.g., using JavaScript libraries for building user interfaces), to generate interactive and dynamic user interfaces, thereby making the platform intuitive and user-friendly.

In some embodiments, a backend of the web application platform (e.g., executing at the server system 108), is implemented using a programming language, such as JavaScript (e.g., using a JavaScript runtime for server-side development). Such a backend is robust and scalable and allows the platform to handle a large number of concurrent requests efficiently, thereby providing a smooth user experience.

In some embodiments, the web application platform includes a payment processing component (e.g., including a set of APIs for receiving and processing payment information).

In some embodiments, the web application platform includes a form builder component (e.g., an online form building component). In some embodiments, the form builder component is configured to create interactive onboarding forms, thereby simplifying the process for users to create accounts and provide user and/or organizational information to inform the platform for subsequent data analysis and insights. In this way, the platform is able to provide personalized/customized analysis, results, and recommendations.

In some embodiments, the web application platform is executed on a compute architecture (e.g., using source-based deployment). In some embodiments, the server system 108 is, or includes, the compute architecture. For example, the compute architecture may be a cloud compute platform that provides a scalable deployment approach that is adaptive and not tied to particular hardware. In some embodiments, the compute architecture includes security and monitoring features for applications deployed thereon.

In some embodiments, the web application platform implements token-based authentication. For example, the token-based authentication optionally uses web tokens (e.g., JSON web tokens) to provide secure and efficient authentication procedures. In some embodiments, web tokens are used to verify the identity of users and ensure that only authorized users access the platform. This use of web tokens helps to protect the platform from unauthorized access and improves the security of user data (and/or organizational data).

In some embodiments, the web application platform includes a load balancer. For example, the platform reduces/eliminates bottlenecks by spreading incoming requests across multiple servers using the load balancer. The use of a load balancer maintains responsivity and accessible even when there's a surge in activity.

An example flow using the web application platform is described below. In this example, user data (e.g., which may be, or include, organizational data) is obtained through the web application platform, which provides a user-friendly interface for users to share their data. As described above, the web application platform may be configured to collect various types of data from users, such as locations, financial data, business metrics, and other relevant information.

To continue the example, when a user interacts with the web application platform, the user's data is securely transmitted to the platform and stored in a database (e.g., a database 106). In this example, the database is used to store and manage the user data (e.g., which may be, or include, organizational data), ensuring that it is easily accessible for analysis and processing. The user data stored in the database may be encrypted to protect sensitive information and ensure data privacy. Additionally, the platform may employ various security measures, such as access controls and data encryption, to protect the integrity and confidentiality of the user data. In this way, the system is able to efficiently collect, store, and manage user data, enabling one part of the generation of insightful notifications for users related to their business.

External data sources (e.g., the external data source(s) 104) such as KPIs, news, traffic, weather, economic indicators, competition data, and safety information may be integrated with (and/or communicatively coupled to) the web application platform. A programming language, such as Python, may be used to perform the ETL (Extract, Transform, Load) process on the external data sources.

The ETL process may include data collection from different external sources like KPIs, news, traffic, weather, economy, competition, and safety sources. For example, Python libraries such as requests or specialized APIs may be used for fetching this data. After fetching, the data may be cleaned and/or transformed into a standard format (e.g., key-value pairs). The data cleaning and/or transforming may include filtering out irrelevant data, standardizing formats, and/or aggregating data from various sources. A programming/software library (e.g., for data manipulation and analysis) may be used for the data cleaning and/or transforming. The cleaned/transformed data may then be stored in a database (e.g., a database 106). A programming/software library may be used to interact/interface with the database to store the prepared dataset. In this way, using the ETL ensures that data from diverse sources is efficiently processed and ready for analysis by a data analysis (e.g., ML engine) module.

In some embodiments, the web application platform includes a computational module (e.g., the computation module 324) for the data analysis. The computational module may include an ML engine (e.g., implemented using a programming language such as Python) for analyzing and processing the external data (e.g., the prepared dataset) and the user data. The ML engine may include one or more algorithms/models configured to extract insights and generate recommendations based on the data to send notifications to the users (e.g., through a messaging application, electronic mail, or/and the web application platform).

The computational module is configured to analyze and process the prepared dataset(s) and the user data (e.g., utilizing GPUs for high-performance parallel processing). In some embodiments, the computation module is configured to execute on one or more GPUs and/or one or more tensor processing units (TPUs). For example, the TPUs may be cloud TPUs configured for executing neural networks and machine learning workloads. Configuring the computational module to execute on GPUs and TPUs (and/or other advanced hardware accelerators) in this way, enhances performance and speeding up computations (e.g., reduces compute time).

The insights and recommendations described above may then be sent to corresponding users. These insights and notifications may be delivered through instant messages, e-mails, and/or displayed on the web application platform interfaces. In this way, users receive relevant and timely information, enhancing their experience and enabling them to make informed decisions.

Figure 2:
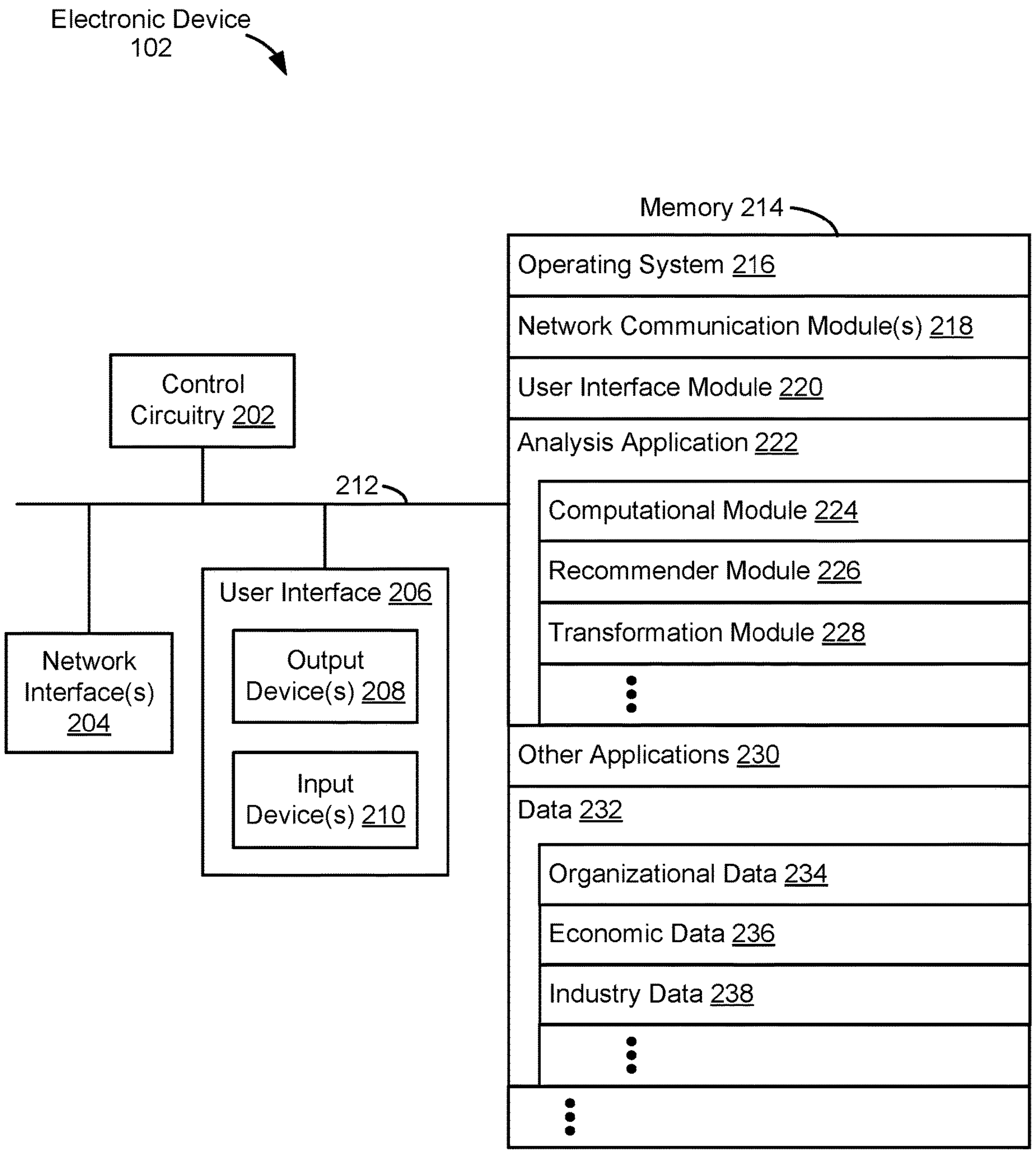
FIG. 2 is a block diagram illustrating an example electronic device in accordance with some embodiments.

FIG. 2 is a block diagram illustrating an electronic device 102 (e.g., electronic device 102-1 and/or electronic device 102-*m*, FIG. 1) in accordance with some embodiments. The electronic device 102 includes control circuitry 202 (e.g., processors, cores, and/or controllers), one or more network (or other communications) interfaces 204, memory 214, and one or more communication buses 212 for interconnecting these components. The communication buses 212 optionally include circuitry (sometimes called a chipset) that interconnects and controls communications between system components. In some embodiments, the electronic device 102 includes one or more components not shown in FIG. 2, such as one or more sensors.

In some embodiments, the electronic device 102 includes a user interface 206, including output device(s) 208 and/or input device(s) 210. In some embodiments, the input devices 210 include a keyboard, mouse, or track pad. Alternatively, or in addition, in some embodiments, the user interface 206 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices 208 include a display, a speaker, an audio jack (or other physical output connection port), and/or other types of output devices. In some embodiments, the electronic device 102 includes a microphone (e.g., for speech recognition).

In some embodiments, the electronic device 102 includes a location-detection component, such as a global navigation satellite system (GNSS) (e.g., global positioning system, GLONASS, Galileo, BeiDou) or other geo-location receiver, and/or location-detection software for determining the location of the electronic device 102 (e.g., a module for finding a position of the electronic device 102 using trilateration of measured signal strengths for nearby devices). In some embodiments, the electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

In some embodiments, the one or more network interfaces 204 include wireless and/or wired interfaces for receiving data from and/or transmitting data to other electronic devices 102, the server system 108, the external data source (s) 104, the database(s) 106, and/or other devices and systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). In some embodiments, data communications are carried out using any of a variety of custom or standard wired protocols (e.g., USB, Firewire, Ethernet, etc.). For example, the network interface (s) 204 may include a wireless interface for enabling wireless data communications with other components of the data analysis architecture 100 and/or or other wireless (e.g., Bluetooth-compatible) devices. In some embodiments, the wireless interface (or a different communications interface of the network interface(s) 204) enables data communications with other WLAN-compatible devices.

The memory 214 may include high-speed random-access memory, such as DRAM, SRAM, DDR RAM, and/or other random-access solid-state memory devices; and may include non-volatile memory, such as one or more magnetic disk storage devices, optical disk storage devices, flash memory devices, or other non-volatile solid-state storage devices. The memory 214 optionally includes one or more storage devices remotely located from the control circuitry 202. The memory 214, or alternately, the non-volatile memory solid-state storage devices within memory 214, includes a non-transitory computer-readable storage medium. In some embodiments, memory 214 or the non-transitory computer-readable storage medium of memory 214 stores the following programs, modules, and data structures, or a subset or superset thereof:

- an operating system 216 (and/or firmware) that includes procedures for handling various basic system services and for performing hardware-dependent tasks;
- network communication module(s) 218 for connecting the electronic device 102 to other computing devices via the network interface(s) 204 (wired or wireless) connected to one or more networks;
- a user interface module 220 that receives commands and/or inputs from a user via the user interface 206 (e.g., from the input devices 210) and provides outputs for presentation (e.g., display on a user interface) via the output devices 208;
- an analysis application 222 for identifying patterns, associations, and/or deficiencies in data (e.g., organizational data, economic data, and/or industry data) and, optionally, providing recommendations/suggestions for addressing the patterns, associations, and/or deficiencies in the data. In some embodiments, the analysis application 222 represents a client-side component of an application that includes a server-side component. In some embodiments, the analysis application 222 is used to monitor, transform, analyze, store, and/or transmit data. In some embodiments, the analysis application 222 includes the following modules (or sets of instructions), or a subset or superset thereof:
  - a computational module 224 for processing (e.g., analyzing and/or transforming) data. In some embodiments, the computational module 224 includes one or more machine learning models (and/or algorithms). In some embodiments, the computational module 224 includes one or more machine learning engines;
  - a recommender module 226 for identifying and/or presenting actions responsive to identified patterns and/or associations in data (e.g., based on outputs of the computational module 224); and
  - a transformation module 228 for transforming, editing, and/or reformatting data. In some embodiments, the transformation module 228 is configured to generate/provide data visualizations;
- other applications 230, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support; and
- data 232 stored at the electronic device 102, such as organizational data 234, economic data 236, industry data 238, and/or other types of data (e.g., user preferences and/or historical use data).

In some embodiments, the analysis application 222 includes a superset, a subset, and/or a different delineation of the modules described above. For example, the analysis application 222 may include a search module configured to allow users to search data within the analysis application 222. In some embodiments, the analysis application 222 includes a frontend component configured to receive user inputs and interface with the computational module 224, the recommender module 226 and/or the transformation module 228. In some embodiments, the organizational data 234 includes forecasting data, operating data, employee data, performance indicators (e.g., KPIs), and/or other types of organizational data. In some embodiments, the economic data 236 includes economic data about a particular location, region, and/or country. In some embodiments, the industry data 238 includes data about a particular industry or sector and/or data about particular organizations in an industry.

Although FIG. 2 illustrates the electronic device 102, FIG. 2 is intended more as a functional description of the various features that may be present in an electronic device than as a structural schematic of the embodiments described herein. In practice, and as recognized by those of ordinary skill in the art, items shown separately could be combined and some items could be separated. For example, the modules of the analysis application 222 may be separated into different applications (e.g., that operate in conjunction with one another).

Figure 3:
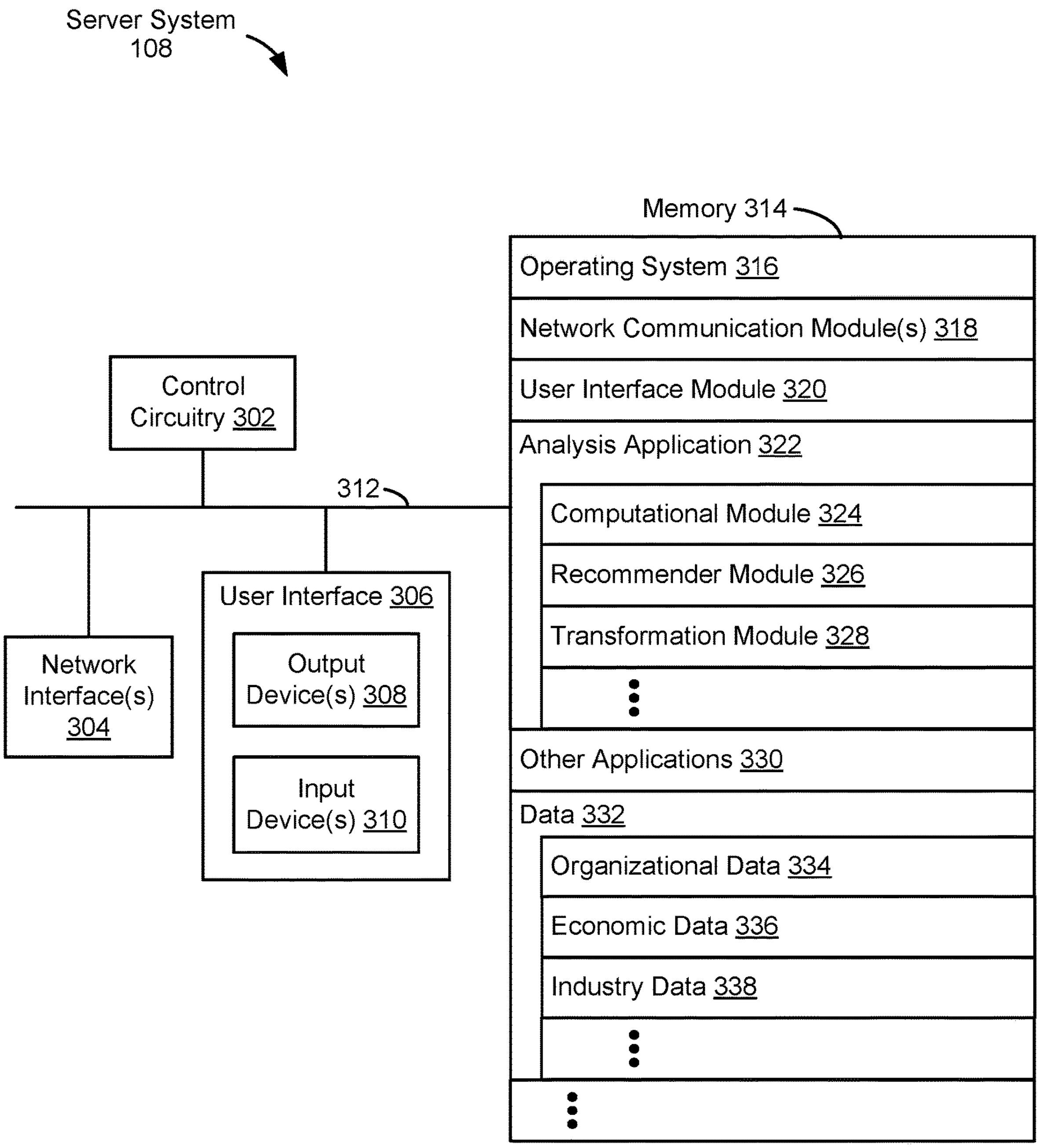
FIG. 3 is a block diagram illustrating an example server system in accordance with some embodiments.

FIG. 3 is a block diagram illustrating a server system 108 in accordance with some embodiments. In some embodiments, the server system 108 includes two or more computing devices (e.g., in separate geographic locations). In some embodiments, the server system 108 is, or includes, a cloud computing system. The server system 108 includes control circuitry 302 (e.g., processors, cores, and/or controllers), one or more network (or other communications) interfaces 304, memory 314, and one or more communication buses 312 for interconnecting these components. The communication buses 312 optionally include circuitry (sometimes called a chipset) that interconnects and controls communications between system components. In some embodiments, the server system 108 includes one or more components not shown in FIG. 3, such as one or more sensors. In some embodiments, the control circuitry 302 includes one or more central processing units (CPUs), one or more graphical processing units (GPUs), and/or one or more neural processing units (NPUs). For example, the GPUs and/or NPUs may be used in conjunction with the computational module 324, while the CPUs may be used with other modules/applications in the memory 314.

In some embodiments, the server system 108 includes a user interface 306, including output device(s) 308 and/or input device(s) 310. In some embodiments, the input devices 310 include a keyboard, a mouse, a track pad, a microphone, and/or a touch-sensitive surface. In some embodiments, the output devices 308 include a display, a speaker, an audio jack (or other physical output connection port), and/or other types of output devices.

In some embodiments, the server system 108 includes a location-detection component, such as a global navigation satellite system (GNSS) (e.g., global positioning system, GLONASS, Galileo, BeiDou) or other geo-location receiver, and/or location-detection software for determining the location of the server system 108. In some embodiments, the server system 108 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

In some embodiments, the one or more network interfaces 304 include wireless and/or wired interfaces for receiving data from and/or transmitting data to other components of the data analysis architecture 100 and/or other devices and systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). In some embodiments, data communications are carried out using any of a variety of custom or standard wired protocols (e.g., USB, Firewire, Ethernet, etc.). For example, the network interface (s) 304 may include a wireless interface for enabling wireless data communications with other components of the data analysis architecture 100 and/or or other wireless (e.g., Bluetooth-compatible) devices. In some embodiments, the wireless interface (or a different communications interface of the network interface(s) 304) enables data communications with other WLAN-compatible devices.

The memory 314 may include high-speed random-access memory, such as DRAM, SRAM, DDR RAM, and/or other random-access solid-state memory devices; and may include non-volatile memory, such as one or more magnetic disk storage devices, optical disk storage devices, flash memory devices, or other non-volatile solid-state storage devices. The memory 314 optionally includes one or more storage devices remotely located from the control circuitry 302. The memory 314, or alternately, the non-volatile memory solid-state storage devices within memory 314, includes a non-transitory computer-readable storage medium. In some embodiments, memory 314 or the non-transitory computer-readable storage medium of memory 314 stores the following programs, modules, and data structures, or a subset or superset thereof:

an operating system 316 (and/or firmware) that includes procedures for handling various basic system services and for performing hardware-dependent tasks;

network communication module(s) 318 for connecting the server system 108 to other computing devices via the network interface(s) 204 (wired or wireless) connected to one or more networks;

a user interface module 320 that receives commands and/or inputs from a user via the user interface 306 (e.g., from the input devices 310) and provides outputs for presentation (e.g., display on a user interface) via the output devices 308;

an analysis application 322 for identifying patterns, associations, and/or deficiencies in data (e.g., organizational data, economic data, and/or industry data) and, optionally, providing recommendations/suggestions for addressing the patterns, associations, and/or deficiencies in the data. In some embodiments, the analysis application 322 represents a server-side component of an application that includes a client-side component (e.g., the analysis application 222, FIG. 2). In some embodiments, the analysis application 322 is used to monitor, transform, analyze, store, and/or transmit data. In some embodiments, the analysis application 322 includes the following modules (or sets of instructions), or a subset or superset thereof:

a computational module 324 for processing (e.g., analyzing and/or transforming) data. In some embodiments, the computational module 324 includes one or more machine learning models (and/or algorithms). In some embodiments, the computational module 324 includes one or more machine learning engines;

a recommender module 326 for identifying and/or presenting actions responsive to identified patterns and/or associations in data (e.g., based on outputs of the computational module 324); and a transformation module 328 for transforming, editing, and/or reformatting data. In some embodiments, the transformation module 328 is configured to generate/provide data visualizations;

other applications 330, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support; and data 332 stored at the server system 108, such as organizational data 334, economic data 336, industry data 338, and/or other types of data (e.g., user preferences and/or historical use data).

In some embodiments, the analysis application 322 includes a superset, a subset, and/or a different delineation of the modules described above. For example, the analysis application 322 may include a search module configured to allow users to search data within the analysis application 322. In some embodiments, the analysis application 322 includes a frontend component configured to receive user inputs and interface with the computational module 324, the recommender module 326 and/or the transformation module 328. In some embodiments, the organizational data 334 includes forecasting data, operating data, employee data, performance indicators (e.g., KPIs), and/or other types of organizational data. In some embodiments, the economic data 336 includes economic data about a particular location, region, and/or country. In some embodiments, the industry data 338 includes data about a particular industry or sector and/or data about particular organizations in an industry.

In some embodiments, the server system 108 includes a web or Hypertext Transfer Protocol (HTTP) server, a File Transfer Protocol (FTP) server, and/or web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in the memory 214 and/or 314 corresponds to a set of instructions for performing a function described herein. The above identified modules or programs (e.g., sets of instructions) need not be implemented as separate software programs, procedures, or modules, and thus various subsets of these modules may be combined or otherwise re-arranged in various embodiments. In some embodiments, the memory 214 and/or 314 store a subset or superset of the respective modules and data structures identified above. Furthermore, the memory 214 and/or 314 optionally store additional modules and data structures not described above. In some embodiments, the applications, modules, and/or data described above in FIGS. 2 and 3 are split between (e.g., present in only one of) the electronic device 102 and the server system 108.

Although FIG. 3 illustrates the server system 108, FIG. 3 is intended more as a functional description of the various features that may be present in a server system than as a structural schematic of the embodiments described herein. In practice, and as recognized by those of ordinary skill in the art, items shown separately could be combined and some items could be separated. For example, some items shown in FIG. 3 could be implemented on single servers and single items could be implemented by one or more servers. In some embodiments, the database(s) 106 and/or the data 332 are stored on devices that are accessible by the server system 108. The actual number of servers used to implement the server system 108, and how features are allocated among them, may vary from one implementation to another and, optionally, depends in part on the amount of data traffic that the server system handles during peak usage periods as well as during average usage periods.

Figure 4:
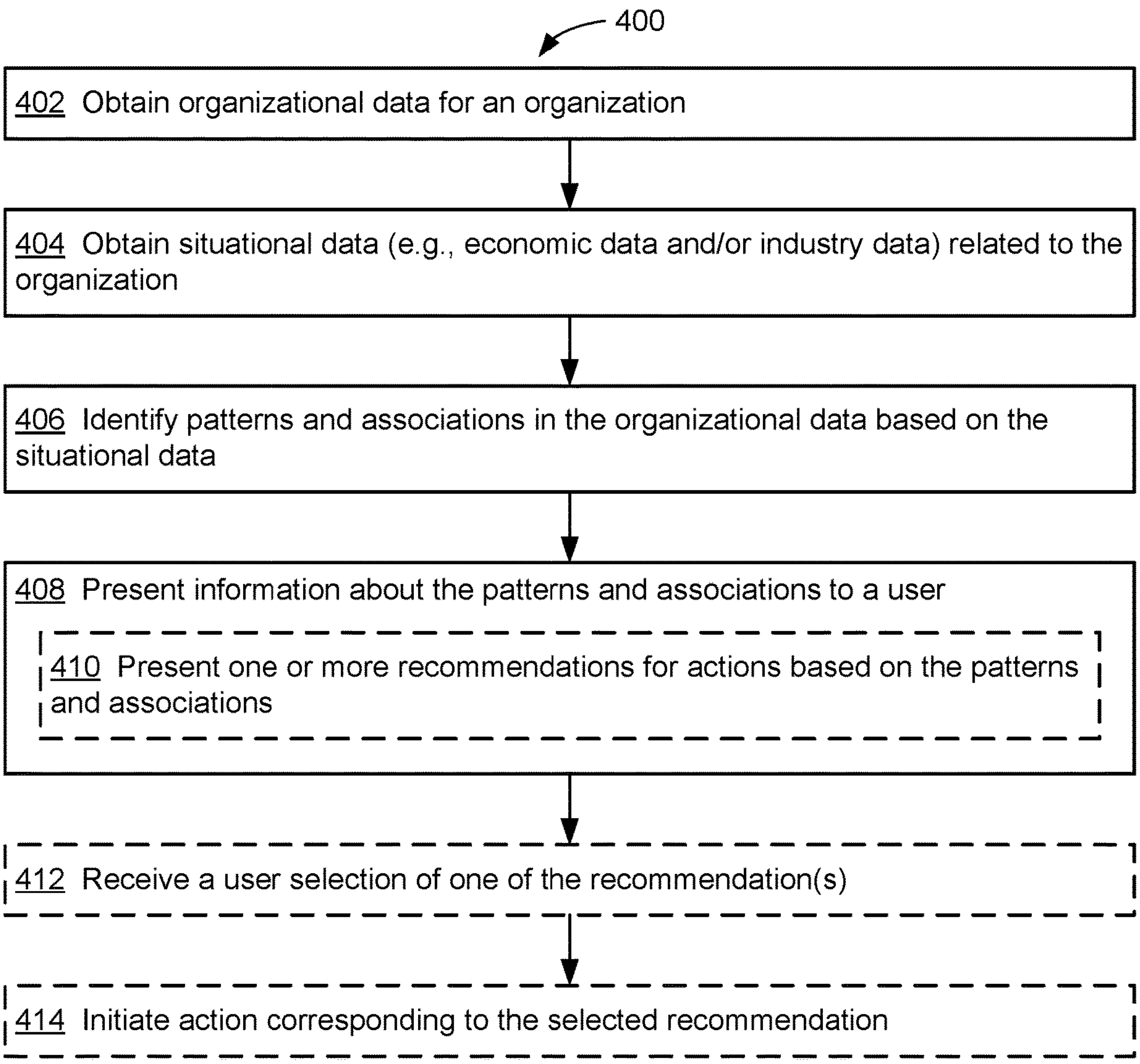
FIG. 4 is a flow diagram illustrating a method of providing pattern and association information to a user in accordance with some embodiments.

FIG. 4 is a flow diagram illustrating a method 400 of providing pattern and association information to a user in accordance with some embodiments. The method 400 may be performed at a computing system (e.g., the server system 108 and/or electronic device(s) 102) having control circuitry and memory storing instructions for execution by the control circuitry. In some embodiments, the method 400 is performed by executing instructions stored in memory (e.g., the memory 214 and/or the memory 314) of the computing system. In some embodiments, the method 400 is performed by a combination of a server system (e.g., the server system 108) and a client device (e.g., an electronic device 102). In some embodiments, the method 400 is performed by a web application platform.

The system obtains (402) organizational data for an organization (e.g., via a network communication module and/or an analysis application (e.g., the analysis application 222)). In some embodiments, the organization is a company, a government, or other type of organization. In some embodiments, the organizational data is obtained from the external data source(s) 104, the database(s) 106, the memory 214 (e.g., the organizational data 234), and/or the memory 314 (e.g., the organizational data 334). In some embodiments, the organizational data includes employee data, organizational structure data (e.g., information about an organizational tree or hierarchy), forecasting data, budgeting/accounting data, operating data, and/or other types of data. In some embodiments, the organizational data is obtained from a database owned/managed by the organization. In some embodiments, the organizational data is pulled from one or more databases (e.g., in response to a user request for data insights). In some embodiments, the organizational data is pushed from one or more databases (e.g., via real-time or periodic updates). In some embodiments, the organizational data is obtained via a software as a service (SaaS) API.

The system obtains (404) situational data (e.g., economic data and/or industry data) for an industry related to the organization (e.g., via a network communication module and/or an analysis application (e.g., the analysis application 222)). In some embodiments, the situational data is obtained from the external data source(s) 104, the database(s) 106, the memory 214 (e.g., the economic data 236 and/or industry data 238), and/or the memory 314 (e.g., the economic data 336 and/or industry data 338). In some embodiments, the situational data is obtained via an industry insights API. In some embodiments, the situational data is pulled from one or more databases (e.g., in response to a user request for data insights). In some embodiments, the situational data is pushed from one or more databases (e.g., via real-time or periodic updates). In some embodiments, the system includes one or more data pipelines for processing and/or transforming the organizational, economic, and/or industry data. For example, the data pipeline(s) may convert unstructured data to structured data and/or may vectorize data (e.g., to provide vector data to the computational module 324).

The system identifies (406) patterns and/or associations (e.g., using the analysis application 322 and/or the computational module 324) in the organizational data based on the situational data. In some embodiments, identifying the patterns and associations includes identifying one or more variances in the forecasting data. In some embodiments, a variance of the one or more variances comprises a key performance indicator variance, a hire planning variance, and/or a budget variance. In some embodiments, the system identifies the patterns and/or associations in response to a user request (e.g., received via a user interface or web application). For example, the system may receive a request from a user and may provide data analysis that is personalized to the user (e.g., based on historical and/or preference data of the user).

In some embodiments, the organizational data and the situational data is provided to a computational model, and the patterns and associations are identified based on an output of the computational model (e.g., a machine learning component). In some embodiments, the patterns and associations are identified using a machine learning (ML) engine (e.g., an ML architecture) that includes one or more of: an encoder, a decoder, and a classifier. In some embodiments, the ML engine includes one or more transformers, one or more neural networks (e.g., CNNs, RNNs, and/or FFNs), and/or one or more generative adversarial networks. In some embodiments, the data is provided to the ML engine in the form of a feature vector. In some embodiments, the ML engine is trained using historical/example data (e.g., organizational data, industry data, and/or economic data).

The system presents (408) information about the patterns and associations to a user (e.g., via one or more of output device(s) 208). In some embodiments, the information about the patterns and associations is displayed in a user interface. In some embodiments, information about the patterns and associations includes one or more data visualizations (e.g., a table, a graph, or other type of data visualization).

In some embodiments, the system presents (410) one or more recommendations for actions based on the patterns and associations. For example, the system may present a recommendation to adjust a forecast and/or operating plan based on the identified patterns and/or associations. In some embodiments, the recommendation includes an indication (e.g., a summary) of the recommendation action. In some embodiments, the recommendation includes an option to generate/present additional details about the recommendation action. In some embodiments, a set of recommendations is presented (e.g., corresponding to different options for addressing a particular pattern, variance, or deficiency). In some embodiments, the set of recommendations are ranked for the user (e.g., based on output of the computational module 324). In some embodiments, the information about the patterns and associations includes one or more recommendations for addressing a variance identified in the patterns and associations.

In some embodiments, the system receives (412) a user selection of one of the recommendation(s). For example, the user selection is received via the user interface 206 or 306. In some embodiments, the recommendation(s) are presented as selectable options. For example, a recommendation to adjust an operating plan in a particular manner is presented along with a button to generate a corresponding adjusted operating plan. In some embodiments, the system initiates (414) an action corresponding to the selected recommendation in response to receiving the user selection. For example, the system initiates an action to: generate a new or adjusted operating plan, generate new forecasting data, and/or generate a set of tasks for implementing a recommended course of action.

Although FIG. 4 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method of performance optimization, the method including: (i) obtaining organizational data for the organization; (ii) obtaining economic data and/or industry data for an industry related to the organization; (iii) identifying patterns and associations in the organizational data based on the economic data and/or the industry data; and (iv) presenting information about the patterns and associations to a user. In some embodiments, the method is performed at a computing system (e.g., the server system 108 and/or an electronic device 102), such as a personal computer, server system, or cloud computing system. In some embodiments, the method is performed at a web application platform (e.g., deployed on the architecture 100). In some embodiments, presenting the information about the patterns and associations to the user includes providing one or more recommendations. For example, a recommendation on how/when to raise capital and/or a recommendation on how/when to cut expenses. In some embodiments, the economic data and the industry data is obtained as situational data.

(A2) In some embodiments of A1, the organizational data includes forecasting data for the organization. In some embodiments, the forecasting data is obtained from an accounting or financing system or database.

(A3) In some embodiments of A2, the forecasting data includes an operating plan for the organization. In some embodiments, the forecasting data includes a financial plan for the organization (e.g., a financial plan for a 3-month, 6-month, or 1-year period).

(A4) In some embodiments of A2 or A3, identifying the patterns and associations includes identifying one or more variances in the forecasting data. In some embodiments, the variance(s) correspond to differences between parameters in the organizational data and the economic/industry data. For example, an operating plan for the organization does not account for an operating condition identified in the economic/industry data. In some embodiments, identifying the patterns and associations includes simulating one or more forecasting and/or operating scenarios for the organization. In some embodiments, identifying the patterns and associations includes simulating a variety of scenarios to determine respective impacts on the organization's cash flow.

(A5) In some embodiments of A4, a variance of the one or more variances includes a key performance indicator (KPI) variance, a hire planning variance, and/or a budget variance. For example, the variance may be a failure of the forecasting data to account for seasonal effects on the organization's industry and/or market. As another example, the variance may be related to having too many, or not enough, employees (e.g., overall, at a given location, or working on a given project). In this example, recommendations may be provided to recruit more employees, offer raises/promotions to current employees, and/or transfer employees to between projects/work groups.

(A6) In some embodiments of any of A1-A5, the organizational data includes accounting data for the organization. In some embodiments, the organizational data includes accounting data, revenue data, human capital/resources data, and/or other forms of data from within the organization. In some embodiments, the forecasting data includes revenue data, funding data, and/or bookkeeping data.

(A7) In some embodiments of any of A1-A6, the organizational data is obtained via an application programming interface (API). For example, the organizational data may include accounting data obtained from an accounting system API.

(A8) In some embodiments of any of A1-A7, the industry data and/or the economic data is obtained from an entity different than the organization. For example, the industry data and/or the economic data may be obtained from a market insights company. In some embodiments, the organizational data is obtained from one or more databases of the organization (and/or databases maintained for the organization).

(A9) In some embodiments of any of A1-A8, the industry data and/or the economic data is obtained via an industry insights API. In some embodiments, the industry data is obtained from a second organization, different from the organization.

(A10) In some embodiments of any of A1-A9, the industry data includes economic data. In some embodiments, the industry data includes location-based economic data, seasonal-based economic data, and/or industry benchmarks.

(A11) In some embodiments of any of A1-A10, the method further includes providing the organizational data and the industry/economic data to a computational model, where the patterns and associations are identified based on an output of the computational model. In some embodiments, the computational model is an artificial intelligence model such as a machine learning model. In some embodiments, the computational model provides one or more machine learning insights, e.g., how the organization's metrics compare with other organizations in the industry or market. In some embodiments, the computational model is a deep learning model (e.g., a multi-layer model). In some embodiments, the computational model is trained using a neural network architecture (e.g., with labeled and/or unlabeled training data).

(A12) In some embodiments of any of A1-A11, the organizational data includes employee data and/or data regarding an organizational structure of the organization. For example, employee data may include information about a headcount at the organization and/or data about each employee's seniority, salary, work location, work group, work products, and the like. The organizational structure data may include information linking supervisors to supervisees within the company (e.g., an organizational tree). In some embodiments, the organizational data includes recruiting data and/or legal data (e.g., a legal structure) of the organization. In some embodiments, the organizational data includes a capitalization table, sales data, and the like.

(A13) In some embodiments of any of A1-A12, the organizational data is obtained via a software as a service (SaaS) API. In some embodiments, the organizational data is obtained from one or more users.

(A14) In some embodiments of any of A1-A13, the information about the patterns and associations includes one or more recommendations for addressing a variance identified in the patterns and associations.

In another aspect, some embodiments include a computing system including one or more processors and memory coupled to the one or more processors, the memory storing one or more programs configured to be executed by the one or more processors, the one or more programs including instructions for performing any of the methods described herein (e.g., A1-A14).

In yet another aspect, some embodiments include a non-transitory computer-readable storage medium storing one or more programs for execution by one or more processors of a computing system, the one or more programs including instructions for performing any of the methods described herein (e.g., A1-A14).

As used herein, the term "parameter" refers to any coefficient or, similarly, any value of an internal or external element (e.g., a weight and/or a hyperparameter) in an algorithm, model, regressor, and/or classifier that can affect (e.g., modify, tailor, and/or adjust) one or more inputs, outputs, and/or functions in the algorithm, model, regressor and/or classifier. For example, in some embodiments, a parameter refers to any coefficient, weight, and/or hyperparameter that can be used to control, modify, tailor, and/or adjust the behavior, learning, and/or performance of an algorithm, model, regressor, and/or classifier. In some instances, a parameter is used to increase or decrease the influence of an input (e.g., a feature) to an algorithm, model, regressor, and/or classifier. As a nonlimiting example, in some embodiments, a parameter is used to increase or decrease the influence of a node (e.g., of a neural network), where the node includes one or more activation functions. Assignment of parameters to specific inputs, outputs, and/or functions is not limited to any one paradigm for a given algorithm, model, regressor, and/or classifier but can be used in any suitable algorithm, model, regressor, and/or classifier architecture for a desired performance. In some embodiments, a parameter has a fixed value. In some embodiments, a value of a parameter is manually and/or automatically adjustable. In some embodiments, a value of a parameter is modified by a validation and/or training process for an algorithm, model, regressor, and/or classifier (e.g., by error minimization and/or backpropagation methods). In some embodiments, an algorithm, model, regressor, and/or classifier of the present disclosure includes a plurality of parameters. In some embodiments, the plurality of parameters is n parameters, where: n≥2; n≥5; n≥10; n≥25; n≥40; n≥50; n≥75; n≥100; n≥125; n≥150; n≥200; n≥225; n≥250; n≥350; n≥500; n≥600; n≥750; n≥1,000; n≥2,000; n≥4,000; n≥5,000; n≥7,500; n≥10,000; n≥20,000; n≥40,000; n≥75,000; n≥100,000; n≥200,000; n≥500,000, $n \geq 1\times10^6$, $n \geq 5\times10^6$, or $n \geq 1\times10^7$. As such, the algorithms, models, regressors, and/or classifiers of the present disclosure cannot be mentally performed. In some embodiments n is between 10,000 and $1\times10^7$, between 100,000 and $5\times10^6$, or between 500,000 and $1\times10^6$. In some embodiments, the algorithms, models, regressors, and/or classifier of the present disclosure operate in a k-dimensional space, where k is a positive integer of 5 or greater (e.g., 5, 6, 7, 8, 9, 10, etc.). As such, the algorithms, models, regressors, and/or classifiers of the present disclosure cannot be mentally performed.

As used herein, the term “instruction” refers to an order given to a computer processor by a computer program. On a digital computer, each instruction is a sequence of 0s and 1s that describes a physical operation the computer is to perform. Such instructions can include data transfer instructions and data manipulation instructions. In some embodiments, each instruction is a type of instruction in an instruction set that is recognized by a particular processor type used to carry out the instructions. Examples of instruction sets include, but are not limited to, Reduced Instruction Set Computer (RISC), Complex Instruction Set Computer (CISC), Minimal instruction set computers (MISC), Very long instruction word (VLIW), Explicitly parallel instruction computing (EPIC), and One instruction set computer (OISC).

In some embodiments, the methods described herein include inputting information into a model comprising a plurality of parameters, wherein the model applies the plurality parameters to the information through a plurality of instructions to generate an output from the model.

In some embodiments, the plurality of parameters is at least 1000 parameters, at least 5000 parameters, at least 10,000 parameters is at least 50,000 parameters, at least 100,000 parameters, at least 250,000 parameters, at least 500,000 parameters, at least 1 million parameters, at least 5 million parameters, at least 10 million parameters, at least 25 million parameters, at least 50 million parameters, at least 100 million parameters, at least 250 million parameters, at least 500 million parameters, at least 1 billion parameters, or more parameters.

In some embodiments, the plurality of instructions is at least 1000 instructions, at least 5000 instructions, at least 10,000 instructions is at least 50,000 instructions, at least 100,000 instructions, at least 250,000 instructions, at least 500,000 instructions, at least 1 million instructions, at least 5 million instructions, at least 10 million instructions, at least 25 million instructions, at least 50 million instructions, at least 100 million instructions, at least 250 million instructions, at least 500 million instructions, at least 1 billion instructions, or more instructions.

The terminology used in the description of the invention herein is for the purpose of describing particular embodiments only and is not intended to be limiting of the invention. As used in the description of the invention and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “comprises” and/or “comprising,” when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of performance optimization, the method comprising:

receiving, via a web application interface, a request from a user to identify key variances for an organization;

obtaining, from a database of the organization, organizational data for the organization, the organizational data including forecasting data for the organization;

obtaining, from an external data source, situational data related to the organization;

converting, via one or more data pipelines, unstructured data from the organizational data and the situational data to structured data;

generating a feature vector by transforming the structured data using an extract, transform, and load (ETL) component;

identifying one or more variances in the organizational data by providing the feature vector to a computational model executing on at least one of a graphical processing unit and a tensor processing unit, wherein the computational model;

comprises at least one of an encoder, a transformer, a neural network, and a decoder, comprises at least one million parameters, is trained to identify associations in the organizational data and the situational data, and identifies the one or more variances by simulating a set of operating scenarios for the organization;

generating respective recommendations for addressing the one or more variances, each recommendation providing guidance to address a corresponding variance; and presenting, to the user via the web application interface, information about the one or more variances and the respective recommendations for addressing the one or more variances.

2. The method of claim 1, wherein the forecasting data includes an operating plan for the organization.

3. The method of claim 1, wherein a variance of the one or more variances comprises a key performance indicator variance, a hire planning variance, and/or a budget variance.

4. The method of claim 1, wherein the organizational data further includes accounting data for the organization.

5. The method of claim 1, wherein the organizational data further includes employee data for the organization.

6. The method of claim 1, wherein the organizational data is obtained via a software as a service application programming interface (API).

7. The method of claim 1, wherein the situational data is obtained from an entity different than the organization.

8. The method of claim 1, wherein the situational data is obtained via an industry insights application programming interface (API).

9. The method of claim 1, wherein the situational data includes economic data and/or industry data.

10. A system, comprising:

one or more processors; and memory that is in communication with the one or more processors, the memory storing instructions for:

receiving, via a web application interface, a request from a user to identify key variances for an organization;

obtaining, from a database of the organization, organizational data for the organization, the organizational data including forecasting data for the organization;

obtaining, from an external data source, situational data related to the organization;

converting, via one or more data pipelines, unstructured data from the organizational data and the situational data to structured data;

generating a feature vector by transforming the structured data using an extract, transform, and load (ETL) component;

identifying one or more variances in the organizational data by providing the feature vector to a computational model executing on at least one of a graphical processing unit and a tensor processing unit, wherein the computational model:

comprises at least one of an encoder, a transformer, a neural network, and a decoder, comprises at least one million parameters, is trained to identify associations in the organizational data and the situational data, and identifies the one or more variances by simulating a set of operating scenarios for the organization;

generating respective recommendations for addressing the one or more variances, each recommendation providing guidance to address a corresponding variance; and presenting, to the user via the web application interface, information about the one or more variances and the respective recommendations for addressing the one or more variances.

11. The system of claim 10, wherein the forecasting data includes an operating plan for the organization.

12. The system of claim 10, wherein a variance of the one or more variances comprises a key performance indicator variance, a hire planning variance, and/or a budget variance.

13. The system of claim 10, wherein the organizational data further comprises one or more of: accounting data for the organization, employee data for the organization, and hierarchy data for the organization.

14. A non-transitory computer-readable storage medium storing one or more sets of instructions configured for execution by a computing device having control circuitry and memory, the one or more sets of instructions comprising instructions for:

receiving, via a web application interface, a request from a user to identify key variances for an organization;

obtaining, from a database of the organization, organizational data for the organization, the organizational data including forecasting data for the organization;

obtaining, from an external data source, situational data related to the organization;

converting, via one or more data pipelines, unstructured data from the organizational data and the situational data to structured data;

generating a feature vector by transforming the structured data using an extract, transform, and load (ETL) component;

identifying one or more variances in the organizational data by providing the feature vector to a computational model executing on at least one of a graphical processing unit and a tensor processing unit, wherein the computational model:

comprises at least one of an encoder, a transformer, a neural network, and a decoder, comprises at least one million parameters, is trained to identify associations in the organizational data and the situational data, and identifies the one or more variances by simulating a set of operating scenarios for the organization;

generating respective recommendations for addressing the one or more variances, each recommendation providing guidance to address a corresponding variance; and presenting, to the user via the web application interface, information about the one or more variances and the respective recommendations for addressing the one or more variances.

15. The non-transitory computer-readable storage medium of claim 14, wherein the forecasting data includes an operating plan for the organization.

16. The non-transitory computer-readable storage medium of claim 14, wherein a variance of the one or more variances comprises a key performance indicator variance, a hire planning variance, and/or a budget variance.

17. The non-transitory computer-readable storage medium of claim 14, wherein the organizational data further comprises one or more of: accounting data for the organization, employee data for the organization, and hierarchy data for the organization.

* * * * *